(12) United States Patent
Vandeventer et al.

(10) Patent No.: US 11,895,141 B1
(45) Date of Patent: Feb. 6, 2024

(54) APPARATUS AND METHOD FOR ANALYZING ORGANIZATION DIGITAL SECURITY

(71) Applicant: Second Sight Data Discovery, Inc., Bloomington, IN (US)

(72) Inventors: Reuben Vandeventer, Bloomington, IN (US); David Imrem, Bloomington, IN (US)

(73) Assignee: Second Sight Data Discovery, Inc.

( * ) Notice: Subject to any disclaimer, the term of this patent is extended or adjusted under 35 U.S.C. 154(b) by 0 days.

(21) Appl. No.: 18/073,289

(22) Filed: Dec. 1, 2022

(51) Int. Cl.
*H04L 9/40* (2022.01)
*H04L 41/16* (2022.01)

(52) U.S. Cl.
CPC .......... *H04L 63/1433* (2013.01); *H04L 41/16* (2013.01)

(58) Field of Classification Search
CPC .................. H04L 63/1433; H04L 41/16
See application file for complete search history.

(56) References Cited

U.S. PATENT DOCUMENTS

| | | | |
|---|---|---|---|
| 9,077,715 B1 * | 7/2015 | Satish | G06F 21/00 |
| 9,930,061 B2 | 3/2018 | Zandani | |
| 10,491,619 B2 | 11/2019 | Yampolskiy | |
| 11,140,193 B2 | 10/2021 | Patel | |
| 11,157,629 B2 | 10/2021 | Shenoy | |
| 2012/0180133 A1 * | 7/2012 | Al-Harbi | H04L 63/1433 726/25 |
| 2020/0089848 A1 | 3/2020 | Abdelaziz | |
| 2022/0129322 A1 * | 4/2022 | Schwartz | G06N 20/20 |
| 2022/0345469 A1 * | 10/2022 | Domagalski | H04L 63/0236 |
| 2023/0077527 A1 * | 3/2023 | Sarkar | G06Q 10/067 |

FOREIGN PATENT DOCUMENTS

| | | | | |
|---|---|---|---|---|
| CN | 111031077 A | * | 4/2020 | |
| CN | 113162815 A | * | 7/2021 | H04L 41/0631 |
| CN | 115883878 A | * | 3/2023 | |
| WO | WO-2018228427 A1 | * | 12/2018 | G06N 20/00 |
| WO | WO-2021044407 A1 | * | 3/2021 | G06F 21/554 |
| WO | WO-2021115255 A1 | * | 6/2021 | |

* cited by examiner

*Primary Examiner* — Sarah Su
(74) *Attorney, Agent, or Firm* — Caldwell Intellectual Property Law

(57) ABSTRACT

An apparatus and method for analyzing organizational digital security are described. The apparatus includes at least a processor and a memory communicatively coupled to the at least a processor. The memory includes instructions configuring the at least a processor to receive organizational data associated with a plurality of organizational resources for an organization, analyze the organizational data, determine an integrity indicator based on the surveying of the organizational data, and generate a continuity indicator as a function of the integrity indicator.

20 Claims, 7 Drawing Sheets

APPARATUS AND METHOD FOR ANALYZING ORGANIZATION DIGITAL SECURITY

FIELD OF THE INVENTION

The present invention generally relates to the field of digital security. In particular, the present invention is directed to an apparatus and method for analyzing organizational digital security.

BACKGROUND

Maintaining integrity in organizational computing resources, computing networks, and other organizational resources is important to maintain effect operation of the organization. Lapses in digital security may lead to unnecessary loss of operation of these organizational resources.

SUMMARY OF THE DISCLOSURE

In an aspect, an apparatus for analyzing organizational digital security is described. The apparatus includes at least a processor and a memory communicatively coupled to the at least a processor. The memory includes instructions configuring the at least a processor to receive organizational data associated with a plurality of organizational resources for an organization, analyze the organizational data, determine an integrity indicator based on the surveying of the organizational data, and generate a continuity indicator as a function of the integrity indicator.

In another aspect, a method for analyzing organizational digital security is described. The apparatus includes at least a processor and a memory communicatively coupled to the at least a processor. The memory includes instructions configuring the at least a processor to receive organizational data associated with a plurality of organizational resources for an organization, analyze the organizational data, determine an integrity indicator based on the surveying of the organizational data, and generate a continuity indicator as a function of the integrity indicator.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for analyzing organizational digital security. In various embodiments, an integrity indicator and a continuity indicator are generated about different elements in an organization. Aspects of the current disclosure allow for efficient and accurate analysis of organizational digital security.

Figure 1:
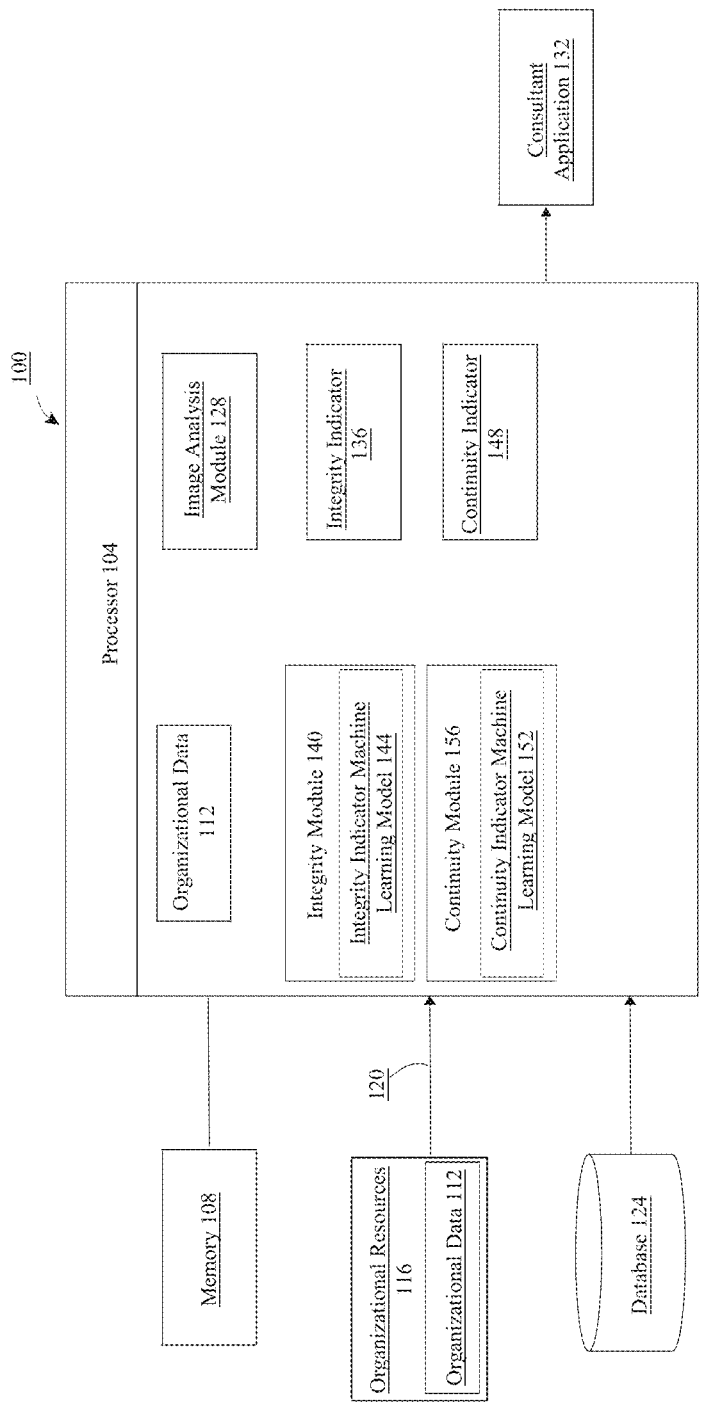
FIG. 1 is a block diagram of an apparatus for analyzing organizational digital security in accordance with one or more embodiments of the present disclosure.

Referring now to FIG. 1, an exemplary embodiment of an apparatus 100 for analyzing organizational digital security is illustrated. Apparatus 100 includes a processor 104. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of system 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, processor 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a processor 104/module to produce outputs given data provided as inputs; this is in contrast to a non-machine learning software program where the commands to be executed are determined in advance by a user and written in a programming language. Machine-learning process may utilize supervised, unsupervised, lazy-learning processes and/or neural networks, described further below.

Continuing to reference to FIG. 1, a computing device and/or apparatus 100 includes a memory 108 and at least a processor 104. Memory 108 may include any memory as described in this disclosure. Memory 108 is communicatively connected to processor 104. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. Memory 108 may be configured to provide instructions to processor 104, which may include any processor as described in this disclosure.

Still referencing FIG. 1, processor 104 is configured to receive organizational data 112 for organizational resources 116 in an organization. "Organizational data," as used in this disclosure is any data and/or information about an organization or organizational resources 116. As used in this disclosure, an "organization" is an organized body of people or resources. In a nonlimiting embodiment, an organization may be a company, business, and the like. As used in this disclosure, an "organizational resources" is an asset that can be used by an organization to perform actions or transactions. In an embodiment, organizational resources 116 may include data about an organizational network, organizational digital resources, and/or organizational staff. As used in this disclosure, "organizational network" is an integrated communications environment where digital devices communicate and manage data and interactions within an organization. In an exemplary embodiment, organizational data 112 for organizational network may include data about a computer network and digital security measures for the computer network. Further, as used in this disclosure, an "organization digital resource" is any software that makes up an organizational network as well as any software or device that can be accessed from the organizational network. In addition, "organizational staff" is any personnel and/or staff resources associated with the organization. In an exemplary embodiment, organizational data 112 for organizational staff may include staff role data, staff relationship data, staff risk data, and the like. As used in this disclosure, "staff role data" is data about a current role and/or position organizational staff may hold within an organization. Further, "staff relationship data," as used in this disclosure, is data about a relative importance of organizational staff within the organization. Additionally, as used in this disclosure, "staff risk data" is data about an ability of organizational staff to do harm to the organization. Further, for instance, and without limitation, organizational resource may be consistent with at least one critical resource in U.S. patent application Ser. No. 18/073, 202, filed on Dec. 1, 2022, and entitled, "APPARATUS AND METHOD FOR ASSESSING SECURITY RISK FOR DIGITAL RESOURCES," which is incorporated by reference herein in its entirety. Additionally, or alternatively, organizational resource may be consistent with a single point of failure in U.S. patent application Ser. No. 18/073, 250, filed on Dec. 1, 2022, and entitled, "APPARATUS AND METHOD FOR IDENTIFYING SINGLE POINTS OF FAILURE," which is incorporated by reference herein in its entirety.

With continued reference to FIG. 1, organizational digital resources may also include any software or device that can be accessed from that computer system and/or organizational network. Digital device, as described above, may be any computing device as described in this disclosure, for example as described in FIG. 7. For example, the organizational network may be one of a computer system, computer network, and the like. In an exemplary embodiment, the organizational network may include a plurality of user devices. A "user device," for the purpose of this disclosure, is any additional computing device, such as a mobile device, laptop, desktop computer, or the like. In a non-limiting embodiment, user device may be a computer and/or smart phone operated by a user in a remote location. User device may include, without limitation, a display; the display may include any display as described in the entirety of this disclosure such as a light emitting diode (LED) screen, liquid crystal display (LCD), organic LED, cathode ray tube (CRT), touch screen, or any combination thereof. In a non-limiting embodiment, user device may include a graphical user interface (GUI) configured to display any information from apparatus 100 and/or any computing device. In some embodiments, the organizational network may also include any electronically based asset associated with the organizational network, as described in more detail below. For example, electronically based digital assets may be computer programs, data, data stores, and the like, but are not limited to such examples. The organizational network may be connected to processor 104 by a network 120, as described in more detail above.

Continuing to reference FIG. 1, receiving the organizational data comprises receiving a user input that comprises the organizational data. As used in this disclosure, a "user input," as used in this disclosure, is a form of data entry received from an individual and/or group of individuals, such as an individual and/or group of individuals that is using and/or interacting with apparatus 100. For example, user input may be received from an organizational network administrator, organizational executive, and the like. In some cases, user input may include selecting a selection from plurality of selections as an answer. In other cases, user input may include a free user input as an answer to a user prompt. Additionally, or alternatively, the user input may include a plurality of configuration data. As used in this disclosure, "configuration data" is data about the arrangement of organizational resources. Additionally, or alternatively, configuration data may include image configuration data. As used in this disclosure, "configuration data" is data about the arrangement of organizational resources. In an exemplary embodiment, configuration data may be in various formats such as, without limitation, txt file, JSON file, word document, pdf file, excel sheet, image, video, audio, and the like. For example, without limitation, configuration data may be specification data, program data, relationship data between organizational resources, and the like for the plurality of organizational digital resources 116. Further, "image configuration data," as used in this disclosure is data about the arrangement of organizational resources in image format. For example, image configuration data may include raw and/or unedited material. Image configuration data may include at least a digital image, either taken using a digital camera or converted to a digital image from a non-digital photographic form using, without limitation, a camera, scanner, or other optical device for image conversion and/or capture, and/or a sequence of such digital images.

Still referring to FIG. 1, additionally, or alternatively, receiving the organizational data may include automatedly surveying the plurality of organizational resources. As used in this disclosure, "automatedly surveying" is scanning a network to collect information on organizational resources connected to an organization, organizational resource performance, and relationships between organization resources. In a non-limiting example, automatedly surveying may include extracting data from organizational resources, such as configuration data. Additionally, or alternatively, automatedly surveying the plurality of organizational resources may include connecting to an organizational network and collecting configuration data for the organizational resources. In an embodiment, processor 104 may be configured to collect configuration data and configuration data in a database, for example database 124. For example, processor 104 may be configured to monitor activities of the organizational resources using the connection to the organizational network and processor 104 may be configured to generate configuration data based on the monitoring of activities.

With continued reference to FIG. 1, processor 104 is configured to analyze the organizational data. In an embodiment, processor 104 may be configured to audit and/or inspect a plurality of organizational resources for an organization. Additionally, or alternatively, the analyzing the organizational data may include analyzing the image configuration data. For example, processor 104 may be configured to determine an organizational configuration risk level using the organizational data. Further, the organizational configuration risk level may be determined based on organizational data, as described below.

Still referring to FIG. 1, analyzing the image configuration data may include performing a plurality of digital processing techniques such as acquisition, image enhancement, image restoration, color image processing, data augmentation, wavelets and multi-resolution processing, image compression, morphological processing, representation and description, object and recognition, and the like on the image configuration data using, for example, an image analysis module 128, to assess a configuration of the configuration data. In some embodiments, analyzing the image configuration data includes utilizing feature extraction. Feature extraction is a part of computer vision, in which, an initial set of the raw data is divided and reduced to more manageable groups. "Features," as used in this disclosure, are parts or patterns of an object in an image that help to identify it. For example—a square has 4 corners and 4 edges, they can be called features of the square. Features may include properties like corners, edges, regions of interest points, ridges, etc. In some embodiments, analyzing the image configuration data may include segmenting an image of image configuration data utilizing image segmentation. "Image segmentation," as used in this disclosure, is a sub-domain of computer vision and digital image processing, as described further below, which aims at grouping similar regions or segments of an image under their respective class labels. For example, image configuration data may be a collage of photos depicting different content. Processor 104 may process image configuration data to extract and group content of the photo to pull only configuration data as described above.

Still referring to FIG. 1, in some embodiments, apparatus 100 may use optical character recognition to parse text, symbols, and the like from image configuration data. For example, optical character recognition may be used to recognize the names and numbers on a plurality of images. Optical character recognition may also be used to distinguish text and symbols in image configuration data. Optical character recognition or optical character reader (OCR) includes automatic conversion of images of written (e.g., typed, handwritten or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

Still referring to FIG. 1, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some cases, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted features can be compared with an abstract vector-like representation of a character, which might reduce to one or more glyph prototypes. General techniques of feature detection in computer vision are applicable to this type of OCR. In some embodiments, machine-learning process like nearest neighbor classifiers (e.g., k-nearest neighbors algorithm) can be used to compare image features with stored glyph features and choose a nearest match. OCR may employ any machine-learning process described in this disclosure, for example machine-learning processes described throughout this disclosure. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool includes OCRopus. OCRopus development is led by German Research Centre for Artificial Intelligence in Kaiserslautern, Germany. In some cases, OCR software may employ neural networks, for example neural networks as taught throughout this disclosure.

Continuing to refer to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make use of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, additionally, or alternatively, analyzing the organizational data may include connecting to a consultant application 132. As used in this disclosure, a "consultant application" is a secondary computer application configured to allow a risk engineer to perform an analysis and/or inspection of the organizational resources. Additionally, or alternatively, processor 104 may be communicatively connected to the consultant application 132. Processor 104 may execute consultation application; alternatively or additionally, consultation application may execute on a distinct and/or remote computing device.

Still referring to FIG. 1, analyzing the organizational data 112 may include receiving a risk engineer profile from an external risk engineer from the consultant application 132. As used in this disclosure "external" is a third party that is not associated with an organization associated with apparatus 100 and/or organizational data. Further, a "risk engineer," as used in this disclosure, is a user that is responsible for assisting an organization in managing losses and reducing risk associated with organizational resources. Further, "risk engineer profile" is, for the purposes of this disclosure, a collection of data and/or information about a risk engineer. In an exemplary embodiment, risk engineer profile may include, without limitation, risk engineer's name, age, gender, identification, profession, experience in profession, professional licenses, and the like. In an embodiment, at least one risk engineer may input a risk engineer profile associated with each risk engineer into consultant application 132. In an embodiment, the at least one risk engineer may be a risk engineer seeking risk engineering work. Further, consultant application 132 may be configured to operate on a user device for the risk engineer. As described herein, a "user device," is any additional computing device, such as a mobile device, laptop, desktop computer, or the like. In a non-limiting embodiment, user device may be a computer and/or smart phone operated by a user in a remote location. User device may include, without limitation, a display; the display may include any display as described in the entirety of this disclosure such as a light emitting diode (LED) screen, liquid crystal display (LCD), organic LED, cathode ray tube (CRT), touch screen, or any combination thereof. In a non-limiting embodiment, user device may include a graphical user interface (GUI) configured to display any information from apparatus 100 and/or any computing device.

Still referring to FIG. 1, analyzing the organizational data may further include outputting a notification to perform organizational configuration analysis to the consultant application 132. As used in this disclosure, "organizational configuration analysis" is a process of examining the construction and/or structure of resources associated with a single organization. In an embodiment, processor 104 may be configured to output the notification to the consultant application. Further, the notification may be configured to notify the risk engineer to perform organizational digital security analysis. In an embodiment, processor 104 may be configured to receive a user input from the risk engineer via the consultant application 132 to perform the organizational configuration analysis. As used in this disclosure, a "user input," is A "User input" as used in this disclosure is information received from an individual. User input may include, for instance and without limitation, information entered via text fields, information entered via clicking on icons of a graphical user interface (GUI) on a user device, information entered via touch input received through one or more touch screens, and the like. Additionally, or alternatively, analyzing the organizational data comprises analyzing the organizational data using the consultant application by the risk engineer. In an embodiment, risk engineer may be able to perform the analysis of the organizational data using apparatus 100 via the consultant application. Additionally, or alternatively, risk engineer may be able to perform the analysis of the organizational data using third party software, tools, applications, and the like. These third-party software, tools, applications and the like may be operated on the user device belonging to the risk engineer. In an embodiment, processor 104 may be configured to automatically perform the analysis of the organizational data, for instance and without limitation, consistent with determining a digital environment risk record in U.S. patent application Ser. No. 17/963,805, filed on Oct. 11, 2022, and entitled, "APPARATUS AND METHOD FOR DETERMINING A RISK ASSOCIATED WITH A CYBER-ATTACK," which is incorporated by reference herein in its entirety.

Continuing to reference FIG. 1, processor 104 is further configured to determine an integrity indicator 136. For example, processor 104 may be configured to generate an integrity indicator 136 for the plurality of organizational digital resources. As used in this disclosure, "integrity indicator" is a score indicating a level of stability in the configuration of the plurality of organizational resources. In an exemplary embodiment, integrity indicator 136 may be a ranking out of five stars, out of a scale of 1-10, a percentage score, and the like indicating a level of stability in the configuration of the plurality of organizational resources. Alternatively, or additionally, the integrity indicator 136 may be an alphabetic score indicating a level of stability in the configuration of the plurality of organizational resources, such as, but not limited to, "A+," "A," "A−," "B+," "B," "B−," "C+," "C," "C−," "D+," "D," "D−," "F," and the like. For example, a plurality of digital resources with an integrity indicator of "61" may be considered as having less stable configuration than a plurality of digital resources with an integrity indicator of "84". Further, organizational data with a more stable configuration, for example less points of failure, more redundancy, and the like, may lead to a higher integrity indicator. Additionally, or alternatively, in an embodiment, the calculating an integrity indicator 136 may comprise calculating the integrity indicator based on at least one of the organizational data and/or the analysis of the organizational data. For example, organizational data may be used by processor 104 as a basis for the calculation of the integrity indicator 136.

Continuing to reference FIG. 1, processor 104 may use a machine learning module, such as integrity module 140, to implement one or more algorithms or generate one or more machine-learning models, such as integrity indicator machine learning model 144, to calculate the integrity indicator. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from a database, such as any database described in this disclosure, or be provided by a user. In other embodiments, a machine-learning module may obtain a training set by querying a communicatively connected database that includes past inputs and outputs. Training data may include inputs from various types of databases, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements. Integrity module 140 may be used to generate integrity indicator machine learning model 144 and/or any other machine learning model using training data. Integrity indicator machine learning model 144 may be trained by correlated inputs and outputs of training data. Training data may be data sets that have already been converted from raw data whether manually, by machine, or any other method. Training data may include previous outputs such that integrity indicator machine learning model 144 iteratively produces outputs. Integrity indicator machine learning model 144 using a machine-learning process may output converted data based on input of training data.

Continuing to reference FIG. 1, in an embodiment, processor 104 may be configured to determine the integrity indicator 136 using a machine learning model, such as integrity indicator machine learning model 144 generated by integrity module 140. Integrity indicator machine learning model 144 may be trained by training data, discussed in further detail below, such as integrity indicator training data. Integrity indicator training data may be stored in database 124.

With continued reference to FIG. 1, determining the integrity indicator 136 using a machine learning model may include receiving integrity indicator training data. In an embodiment, integrity indicator training data may include an organizational datum 112 that is correlated to an integrity indicator datum. For example, integrity indicator training data may be used to show organizational data may indicate a particular integrity indicator. In an exemplary embodiment, an integrity indicator may be high, average, low, and the like. In a further embodiment, integrity indicator training data may also include a plurality of organizational data 112 that are each correlated to one integrity indicator of a plurality of integrity indicators. In such an embodiment, integrity indicator training data may be used to show how organizational data 112 may indicate a particular integrity indicator. Determining an integrity indicator using a machine learning model may further include training an integrity indicator machine learning model 144 as a function of integrity indicator training data. Further, determining an integrity indicator using a machine learning model may also include calculating the integrity indicator 136 using the trained integrity indicator machine learning model 144. Alternatively, or additionally, a fuzzy inferencing system for determination of an integrity indicator may be employed, where any or all integrity indicators may be represented as values and/or fuzzy sets for linguistic variables measuring the same, as described in more detail in FIG. 5. An inferencing system may use one or more fuzzy inferencing rules, as described below in FIG. 5, to output one or more linguistic variable values and/or defuzzified values indicating a plurality of integrity indicators.

Continuing to reference FIG. 1, additionally, or alternatively, the determining the integrity indicator may comprise generating, by the at least a processor 104, an influence indicator classifier. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Processor 104 and/or another device may generate a classifier using a classification algorithm, defined as a process whereby a processor 104 derives a classifier from training data. Classification may be performed using, without limitation, linear classifiers such as without limitation logistic regression and/or naïve Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, processor 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)\div P(B)$, where $P(AB)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 104 may then calculate a likelihood table by calculating probabilities of different data entries and classification labels. Processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, processor 104 may be configured to generate a classifier using a K-nearest neighbors (KNN) algorithm. A "K-nearest neighbors algorithm" as used in this disclosure, includes a classification method that utilizes feature similarity to analyze how closely out-of-sample- features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values. Integrity indicator classifier may classify user data to one or more types and/or category of integrity indicator, which may include any type of integrity indicator, sub-categories and/or more specific categories, or the like. For instance, integrity indicator classifier may receive user data and may classify the organization to an integrity indicator. Integrity indicator classifier may be trained using training data correlating user data to categories of integrity indicator. Additionally, or alternatively, the determining the integrity indicator may comprise classifying, by the at least a processor, the organization associated with organizational data to at least one integrity indicator using the integrity indicator classifier and outputting, by the at least a processor, the at least one integrity indicator for each user.

Continuing to reference FIG. 1, processor 104 may further be configured to determine a categorical integrity indicator. In a non-limiting exemplary embodiment, processor 104 may be configured to generate an integrity indicator for each category of organizational digital resources. For example, processor 104 may be configured to generate an integrity indicator for each of the organizational network, organizational digital resources, and/or organizational staff. In an exemplary embodiment, categorical integrity indicator may be a ranking out of five stars, out of a scale of 1-10, a percentage score, and the like indicating a level of stability in the configuration of the category of organizational resources. Alternatively, or additionally, the integrity indicator may be an alphabetic score indicating a level of stability in the configuration of the category of organizational resources, such as, but not limited to, "A+," "A," "A−," "B+," "B," "B−," "C+," "C," "C−," "B+," "B," "B−," "F," and the like. For example, an organizational network with an integrity indicator of "71" may be considered as having less stable configuration than an organization staff with an integrity indicator of "91". Further, categories of organizational data with a more stable configuration, for example less points of failure, more redundancy, and the like, may lead to a higher integrity indicator. Additionally, or alternatively, in an embodiment, the calculating an integrity indicator may comprise calculating the categorial integrity indicator based on at least one of a categorical organizational data and/or the analysis of the categorical organizational data. For example, categorical organizational data may be used by processor 104 as a basis for the calculation of the integrity indicator. Alternatively, or additionally, a fuzzy inferencing system for determination of a continuity indicator may be employed, where any or all continuity indicators may be represented as values and/or fuzzy sets for linguistic variables measuring the same, as described in more detail in FIG. 5. An inferencing system may use one or more fuzzy inferencing rules, as described below in FIG. 5, to output one or more linguistic variable values and/or defuzzified values indicating a plurality of continuity indicators.

Continuing to reference FIG. 1, in an embodiment, processor 104 may be configured to determine the categorical integrity indicator using a machine learning model, such as integrity indicator machine learning model 144 generated by integrity module 140. Integrity indicator machine learning model 144 may be trained by training data, such as integrity indicator training data. Integrity indicator training data may be stored in database 124.

With continued reference to FIG. 1, determining the categorical integrity indicator using a machine learning model may include receiving categorical integrity indicator training data. In an embodiment, categorical integrity indicator training data may include a categorical organizational datum 112 that is correlated to a categorical integrity indicator datum. For example, categorical integrity indicator training data may be used to show how a categorical organization datum may indicate a particular categorical integrity indicator. In an exemplary embodiment, a categorical integrity indicator may be high, average, low, a numeric score, and the like as described above. In a further embodiment, categorical integrity indicator training data may also include a plurality of categorical organizational data 112 that are each correlated to a categorical integrity indicator of a plurality of categorical integrity indicators. In such an embodiment, categorical integrity indicator training data may be used to show how categorical organizational data 112 may indicate a particular categorical integrity indicator. Determining a categorical integrity indicator using a machine learning model may further include training a categorical integrity indicator machine learning model as a function of categorical integrity indicator training data. Further, determining a categorical integrity indicator using a machine learning model may also include calculating the categorical integrity indicator using the trained categorical integrity indicator machine learning model.

Continuing to reference FIG. 1, processor 104 is further configured to determine a continuity indicator 148. For example, processor 104 may be configured to generate a continuity indicator 148 for the plurality of organizational digital resources. As used in this disclosure, "continuity indicator" is a score indicating a level of preparedness for avoiding an interruption in the operation of the plurality of organizational resources. In an exemplary embodiment, continuity indicator 148 may be a ranking out of five stars, out of a scale of 1-10, a percentage score, and the like indicating a level of stability in the configuration of the plurality of organizational resources. Alternatively, or additionally, the continuity indicator 148 may be an alphabetic score indicating a level of stability in the configuration of the plurality of organizational resources, such as, but not limited to, "A+," "A," "A−," "B+," "B," "B−," C+," "C," "C−," B+," "B," "B−," "F," and the like. For example, a plurality of digital resources with a continuity indicator of "82" may be considered as having less stable configuration than a plurality of digital resources with an integrity indicator of "89". Additionally, or alternatively, in an embodiment, the calculating a continuity indicator 148 may comprise calculating the continuity indicator 148 based on at least one of the organizational data, the analysis of the organizational data, and/or the integrity indicator. For example, at least one of the organizational data, the analysis of the organizational data, and/or the integrity indicator may be used by processor 104 as a basis for the calculation of the continuity indicator 148. For example, organizational data with a more stable configuration and/or a higher integrity indicator may lead to a higher continuity indicator 148.

Continuing to reference FIG. 1, in an embodiment, processor 104 may be configured to determine the continuity indicator 148 using a machine learning model, such as continuity indicator machine learning model 152 generated by continuity module 156. Continuity machine learning model 148 may be trained by training data, discussed herein, such as continuity indicator training data. Continuity indicator training data may be stored in database 124.

With continued reference to FIG. 1, determining the continuity indicator 148 using a machine learning model may include receiving continuity indicator training data. In an embodiment, continuity indicator training data may include an organizational datum 112 that is correlated to a continuity indicator datum. In a further exemplary embodiment, continuity indicator training data may also include an integrity indicator datum that is correlated to a continuity indicator datum. For example, continuity indicator training data may be used to show organizational data and/or integrity indicator may indicate a particular continuity indicator. In an exemplary embodiment, a continuity indicator may be high, average, low, and the like. In a further embodiment, continuity indicator training data may also include a plurality of organizational data 112 and/or integrity indicator data that are each correlated to one continuity indicator of a plurality of continuity indicators. In such an embodiment, continuity indicator training data may be used to show how organizational data 112 and/or integrity indicator data may indicate a particular continuity indicator. Determining a continuity indicator using a machine learning model may further include training a continuity indicator machine learning model 152 as a function of continuity indicator training data. Further, determining a continuity indicator using a machine learning model may also include calculating the continuity indicator using the trained continuity indicator machine learning model 148.

Continuing to reference FIG. 1, processor 104 is further configured to determine a categorical continuity indicator. In a non-limiting exemplary embodiment, processor 104 may be configured to generate a continuity indicator for each category of organizational digital resources. For example, processor 104 may be configured to determine a continuity indicator for each of the organizational network, organizational digital resources, and/or organizational staff. In an exemplary embodiment, categorical continuity indicator may be a ranking out of five stars, out of a scale of 1-10, a percentage score, and the like indicating a level of preparedness to avoid interruption in operational continuity for each category of organizational resources. Alternatively, or additionally, the continuity indicator may be an alphabetic score indicating a level of preparedness to avoid interruption in operational continuity for each category of organizational resources, such as, but not limited to, "A+," "A," "A−," "B+," "B," "B−," C+," "C," "C−," D+," "D," "D−," "F," and the like. For example, an organizational digital resource with an integrity indicator of "93" may be considered as having more stable configuration than an organizational staff with an integrity indicator of "84". Further, categories of organizational data with a more stable configuration, for example less points of failure, more redundancy, and the like, may lead to a higher continuity indicator. Additionally, or alternatively, in an embodiment, the calculating a continuity indicator may comprise calculating the categorial continuity indicator based on at least one of a categorical organizational data the analysis of the categorical organizational data, and/or categorical integrity indicator. For example, categorical organizational data may be used by processor 104 as a basis for the calculation of the continuity indicator. For example, categorical organizational data with a more stable configuration and/or a higher categorical integrity indicator may lead to a higher categorical continuity indicator.

Continuing to reference FIG. 1, in an embodiment, processor 104 may be configured to determine the categorical continuity indicator using a machine learning model, such as continuity indicator machine learning model 152 generated by continuity module 156. Continuity machine learning model 152 may be trained by training data, such as continuity indicator training data. Continuity indicator training data may be stored in database 124.

With continued reference to FIG. 1, determining the categorical continuity indicator using a machine learning model may include receiving categorical continuity indicator training data. In an embodiment, categorical continuity indicator training data may include a categorical organizational datum 112 that is correlated to a categorical continuity indicator datum. In a further exemplary embodiment, categorical continuity indicator training data may also include a categorical integrity indicator datum that is correlated to a categorical continuity indicator datum. For example, categorical continuity indicator training data may be used to show how a categorical organizational datum and/or categorical integrity indicator datum may indicate a particular categorical continuity indicator. In an exemplary embodiment, a categorical continuity indicator may be high, average, low, a numeric score, and the like as described above. In a further embodiment, categorical continuity indicator training data may also include a plurality of categorical organizational data 112 and/or categorical integrity indicator datum that are each correlated to a categorical continuity indicator of a plurality of categorical continuity indicators. In such an embodiment, categorical continuity indicator training data may be used to show how categorical organizational data 112 and/or categorical integrity indicator datum may indicate a particular categorical continuity indicator. Determining a categorical continuity indicator using a machine learning model may further include training a categorical continuity indicator machine learning model as a function of categorical continuity indicator training data. Further, determining a categorical continuity indicator using a machine learning model may also include calculating the categorical continuity indicator using the trained categorical continuity indicator machine learning model.

Figure 2:
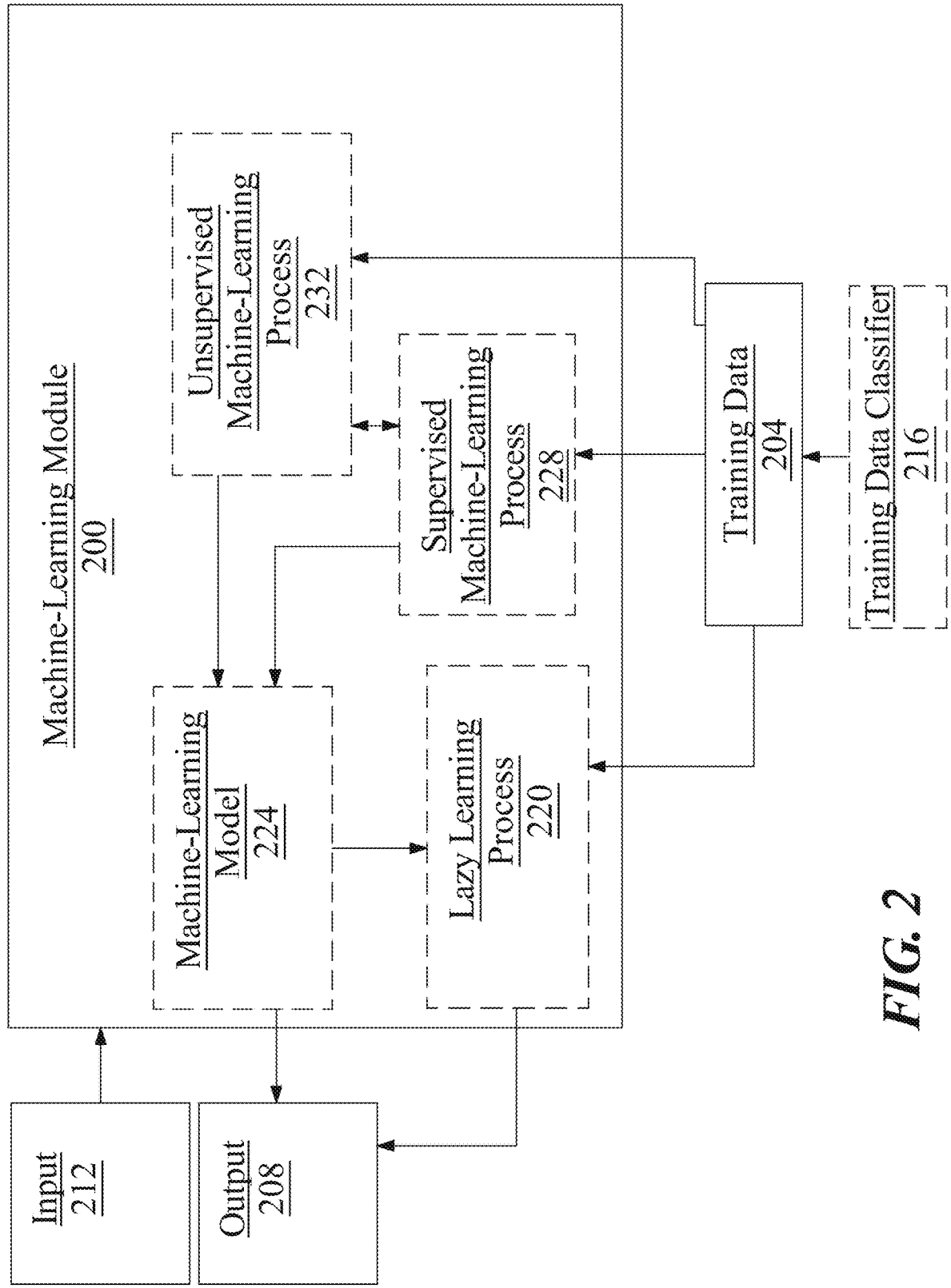
FIG. 2 is an exemplary embodiment of a machine-learning module in accordance with one or more embodiments of the present disclosure.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example, a user profile may be an input and a predictive quantifier may be an output.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 200 may generate a classifier using a classification algorithm, defined as a process whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to categories of users, influence indicators, and/or utilization indicators for which a subset of training data may be selected.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors' algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include any input as described above as inputs, any output as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 3:
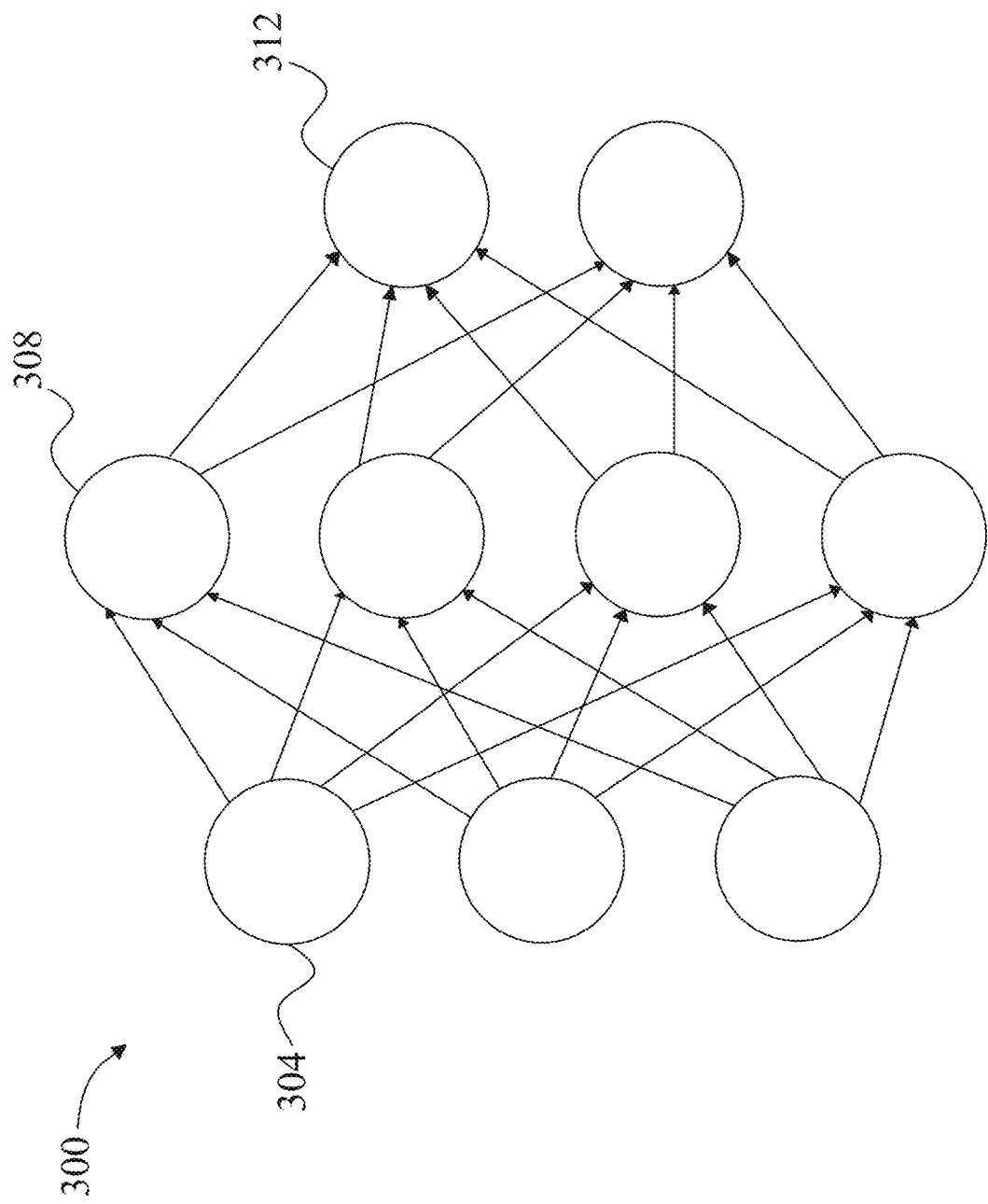
FIG. 3 is a diagram of an exemplary nodal network in accordance with one or more embodiments of the present disclosure.

Referring now to FIG. 3, an exemplary embodiment of neural network 300 is illustrated. A neural network 300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 304, one or more intermediate layers 308, and an output layer of nodes 312. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 4:
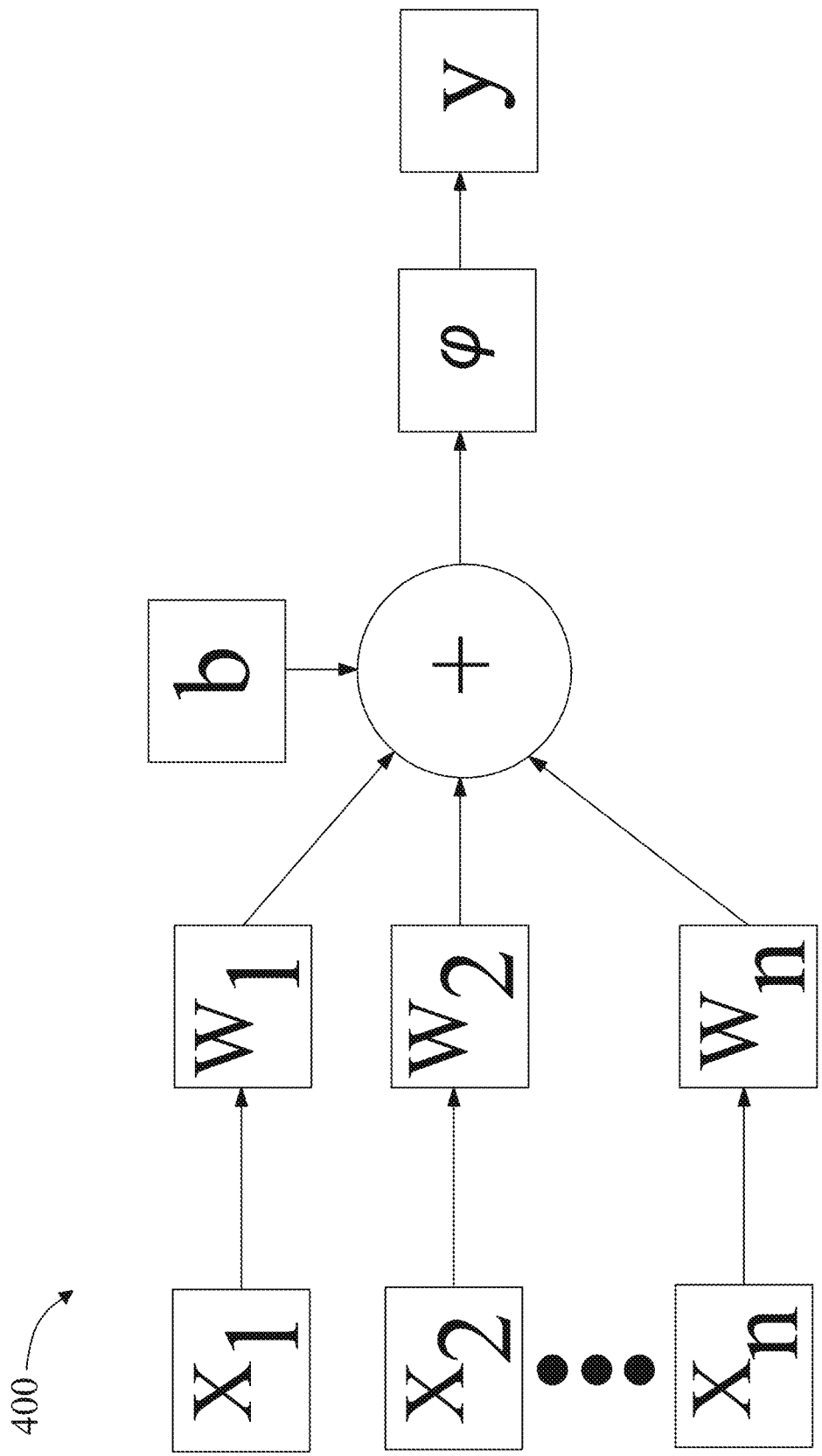
FIG. 4 is a block diagram of an exemplary node in accordance with one or more embodiments of the present disclosure.

Referring now to FIG. 4, an exemplary embodiment of a node 400 of a neural network is illustrated. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally, or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 5:
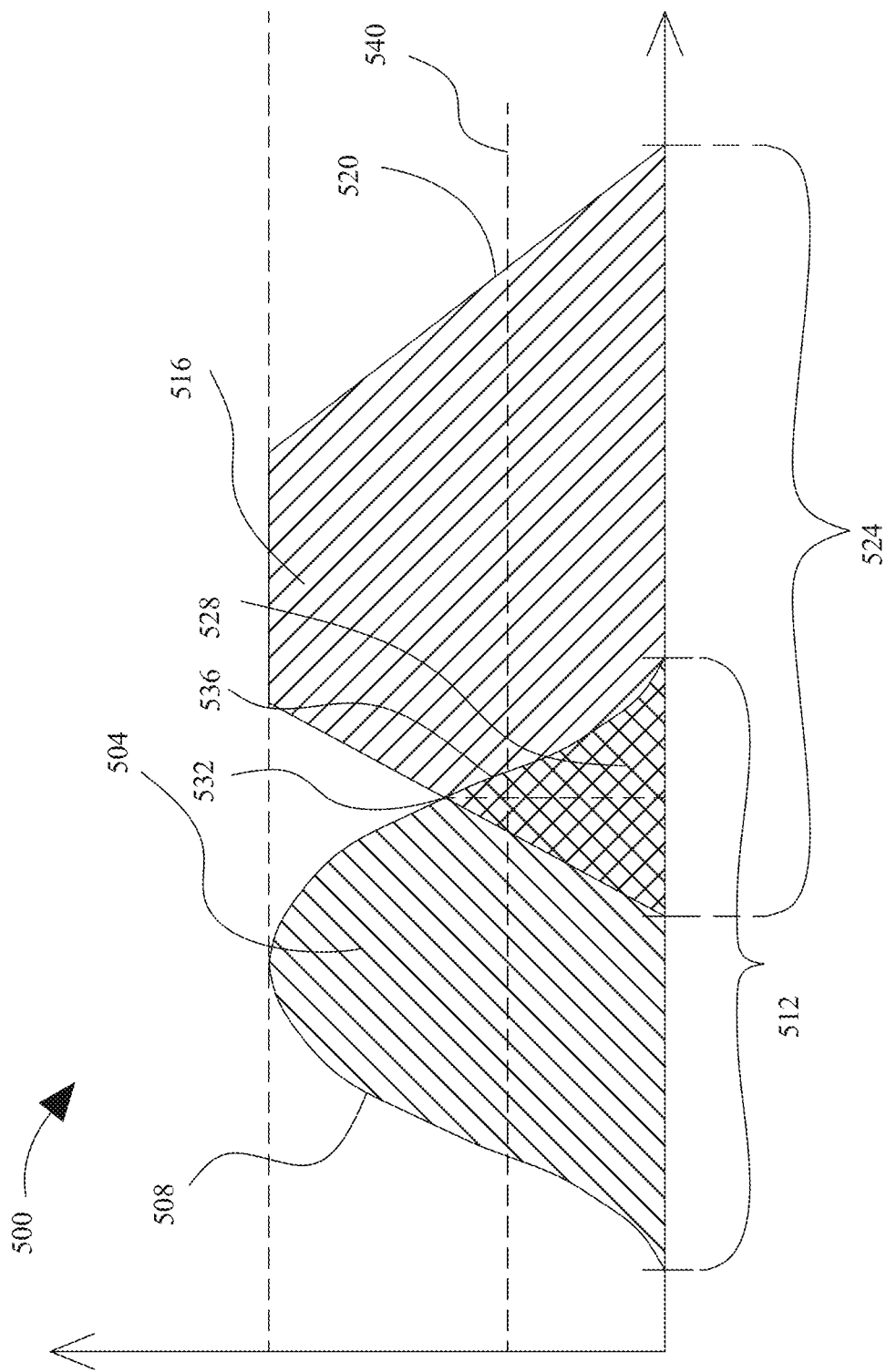
FIG. 5 is a schematic diagram illustrating an exemplary embodiment of a fuzzy inferencing system.

Referring to FIG. 5, an exemplary embodiment of fuzzy set comparison 500 is illustrated. A first fuzzy set 504 may be represented, without limitation, according to a first membership function 508 representing a probability that an input falling on a first range of values 512 is a member of the first fuzzy set 504, where the first membership function 508 has values on a range of probabilities such as without limitation the interval [0,1], and an area beneath the first membership function 508 may represent a set of values within first fuzzy set 504. Although first range of values 512 is illustrated for clarity in this exemplary depiction as a range on a single number line or axis, first range of values 512 may be defined on two or more dimensions, representing, for instance, a Cartesian product between a plurality of ranges, curves, axes, spaces, dimensions, or the like. First membership function 508 may include any suitable function mapping first range 512 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \le x < b \\ \frac{c-x}{c-b}, & \text{if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 5, first fuzzy set 504 may represent any value or combination of values as described above, including output from one or more machine-learning models. A second fuzzy set 516, which may represent any value which may be represented by first fuzzy set 504, may be defined by a second membership function 520 on a second range 524; second range 524 may be identical and/or overlap with first range 512 and/or may be combined with first range via Cartesian product or the like to generate a mapping permitting evaluation overlap of first fuzzy set 504 and second fuzzy set 516. Where first fuzzy set 504 and second fuzzy set 516 have a region 528 that overlaps, first membership function 508 and second membership function 520 may intersect at a point 532 representing a probability, as defined on probability interval, of a match between first fuzzy set 504 and second fuzzy set 516. Alternatively, or additionally, a single value of first and/or second fuzzy set may be located at a locus 536 on first range 512 and/or second range 524, where a probability of membership may be taken by evaluation of first membership function 508 and/or second membership function 520 at that range point. A probability at 528 and/or 562 may be compared to a threshold 540 to determine whether a positive match is indicated. Threshold 540 may, in a non-limiting example, represent a degree of match between first fuzzy set 504 and second fuzzy set 516, and/or single values therein with each other or with either set, which is sufficient for purposes of the matching process; for instance, threshold may indicate a sufficient degree of overlap between an output from one or more machine-learning models, for combination to occur as described above. Alternatively, or additionally, each threshold may be tuned by a machine-learning and/or statistical process, for instance and without limitation as described in further detail below.

Further referring to FIG. 5, in an embodiment, a degree of match between fuzzy sets may be used to classify organizational data with at least one corresponding integrity indicator. For example, if user data has a fuzzy set matching high integrity indicator fuzzy set by having a degree of overlap exceeding a threshold, processor 104 may determine high integrity indicator as the integrity indicator for the organization configuration associated with organizational data. Where multiple fuzzy matches are performed, degrees of match for each respective fuzzy set may be computed and aggregated through, for instance, addition, averaging, or the like, to determine an overall degree of match.

Still referring to FIG. 5, in an embodiment, user data may be compared to multiple integrity indicator fuzzy sets. For instance, user data, as described above, may be represented by a fuzzy set that is compared to each of the multiple integrity indicator fuzzy sets; and a degree of overlap exceeding a threshold between the organizational data fuzzy set and any of the multiple integrity indicator fuzzy sets may cause processor 104 to identify each of the integrity indicators as recommended integrity indicators of the at least one integrity indicators. For instance, in one embodiment there may be integrity indicator fuzzy sets, representing respectively high integrity indicator and average integrity indicator. A high integrity indicator may have a first fuzzy set; average integrity indicator may have a second fuzzy set; and organizational data may have an organizational data fuzzy set. Processor 104, for example, may compare an organizational data fuzzy set with each of high integrity indicator fuzzy set and average integrity indicator fuzzy set, as described above, and identify either, both, or neither of high integrity indicator nor average integrity indicator as at least one integrity indicator for the organization. Machine-learning methods as described throughout may, in a non-limiting example, generate coefficients used in fuzzy set equations as described above, such as without limitation x, c, and σ of a Gaussian set as described above, as outputs of machine-learning methods.

Still referring to FIG. 5, a processor may use a logic comparison program, such as, but not limited to, a fuzzy logic model to determine a compatibility score. A compatibility score may include, but is not limited to, high compatibility, mid compatibility, low compatibility, and the like; each such score may be represented as a value for a linguistic variable representing score, or in other words a fuzzy set as described above that corresponds to a degree of match of integrity indicator calculated using any statistical, machine-learning, or other method that may occur to a person skilled in the art upon reviewing the entirety of this disclosure. In other words, a given element of user profile and/or user related data may have a first non-zero value for membership in a first linguistic variable value such as a first influence indicator and a second non-zero value for membership in a second linguistic variable value such as a second influence indicator. In some embodiments, determining an influence indicator may include using a linear regression model. A linear regression model may include a machine learning model. A linear regression model may be configured to map data of user to one or more influence indicators. A linear regression model may be trained using training data as discussed above. In some embodiments, determining at least one influence indicator may include using an influence indicator classification model. An integrity indicator classification model may be configured to input collected data and cluster data to a centroid based on, but not limited to, frequency of appearance, and the like. Centroids may include compatibility scores assigned to them such that each user profile and/or user related data may each be assigned a compatibility score. In some embodiments, an urgency classification model may include a K-means clustering model. In some embodiments, an urgency classification model may include a particle swarm optimization model. In some embodiments, determining a compatibility score of user data may include using a fuzzy inference engine. A fuzzy inference engine may be configured to map one or more data elements using fuzzy logic. In some embodiments, a plurality of user designations may be arranged by a logic comparison program into compatibility score arrangements. A "compatibility score arrangement" as used in this disclosure is any grouping of objects and/or data based on degree of match for user designation. This step may be implemented as described above. Membership function coefficients and/or constants as described above may be tuned according to classification and/or clustering algorithms. For instance, and without limitation, a clustering algorithm may determine a Gaussian or other distribution of questions about a centroid corresponding to a given level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 5, an inference engine may be implemented according to input and/or output membership functions and/or linguistic variables. Continuing the example, an output linguistic variable may represent, without limitation, a low integrity indicator. An inference engine may combine rules, such as: "if the redundancy is 'low' and the single point of failure is 'high', the integrity indicator is 'low'"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T (T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b-a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, ssociativity: ⊥(a, ⊥(b, c))=⊥(⊥(a, b), c), and identity element of 0. Alternatively, or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively, or additionally, output rules may be replaced with functions according to the Takagi-Sugeno-King (TSK) fuzzy model.

Figure 6:
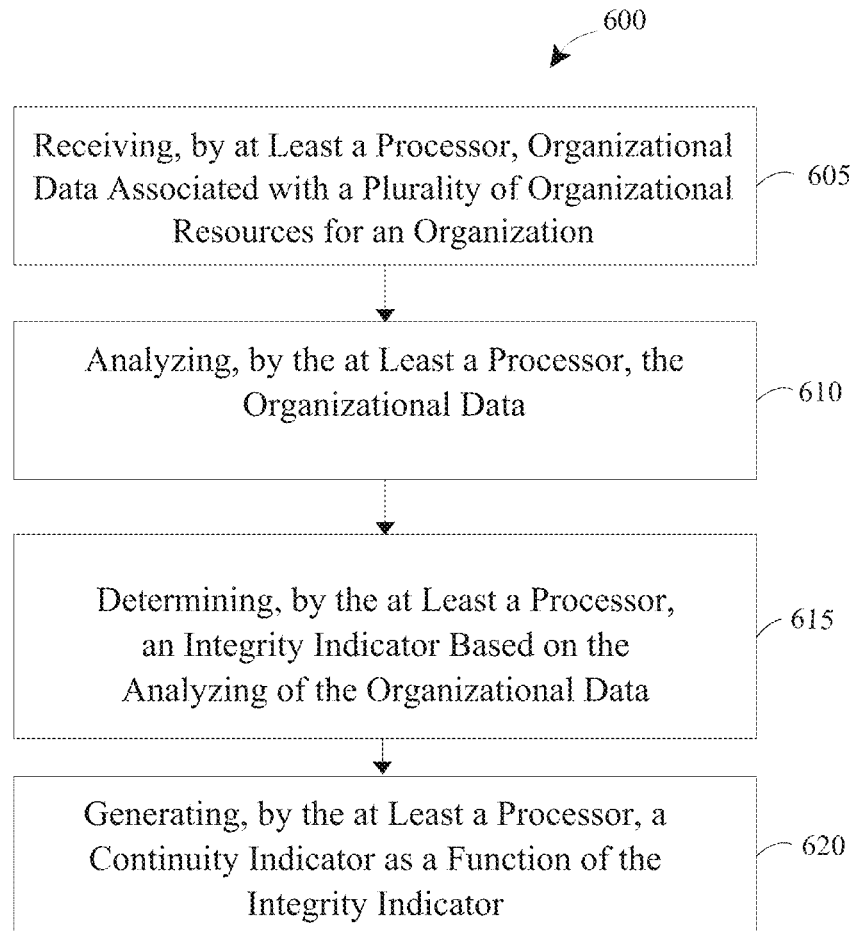
FIG. 6 is a flow diagram illustrating a method for analyzing organizational digital security in accordance with one or more embodiments of the present disclosure.

Referring now to FIG. 6, an exemplary embodiment of method 600 for analyzing organizational digital security is shown. Step 605 of method 600 includes receiving, by at least a processor, organizational data associated with a plurality of organizational resources for an organization. In an embodiment, the receiving the organizational data may comprise receiving a user input. Additionally, or alternatively, the user input may comprise a plurality of configuration data. Additionally, or alternatively, the configuration data may comprise image configuration data. In an exemplary embodiment, the receiving the organizational data may comprise automatedly surveying, by the at least a processor, the plurality of organizational resources and collecting, by the at least a processor, the configuration data for the organizational resources. These may be implemented, without limitation, as described above in reference to FIGS. 1-5.

Still referring to FIG. 6, method 600 may include analyzing, by the at least a processor, the organizational data at step 610. In an embodiment, the analyzing the organizational data may comprise analyzing, by the at least a processor, the image configuration data using computer vision. Additionally, or alternatively, analyzing the organizational data may include connecting, by the at least a processor, to a consultant application and receiving, by the at least a processor, a risk engineer profile from a risk engineer using the consultant application. Further, the analyzing the organizational data further may comprise outputting, by the at least a processor, a notification to perform organizational digital security analysis to the risk engineer using the consultant application. In an embodiment, the analyzing the organizational data may comprise analyzing, by the at least a processor, the organizational data using the consultant application. These may be implemented, without limitation, as described above in reference to FIGS. 1-5.

With further reference to FIG. 6, step 615 of method 600 includes determining, by the at least a processor, an integrity indicator based on the surveying of the organizational data. In an embodiment, the determining the integrity indicator based on the surveying of the organizational data may comprise determining, by the at least a processor, the integrity indicator using an integrity indicator machine learning model. These may be implemented, without limitation, as described above in reference to FIGS. 1-5.

Still referring to FIG. 6, step 620 of method 600 includes generating, by the at least a processor, a continuity indicator as a function of the integrity indicator. Additionally, or alternatively, generating the continuity indicator as a function of the integrity indicator comprises generating, by the at least a processor, the continuity indicator using a continuity indicator machine learning model. These may be implemented, without limitation, as described above in reference to FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
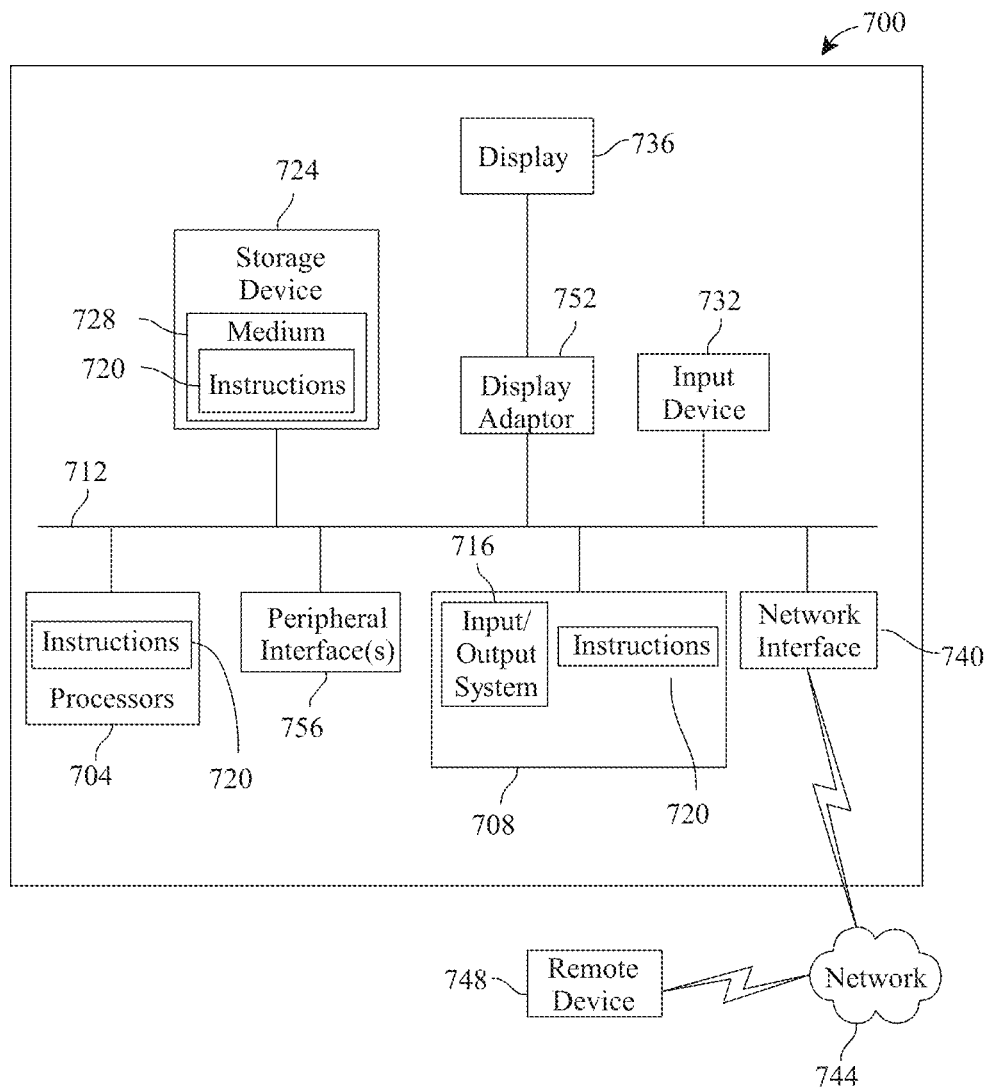
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756.

Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve apparatuses and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for analyzing organizational digital security, the apparatus comprising:
   at least a processor; and
   a memory communicatively coupled to the at least a processor, the memory containing instructions configuring the at least a processor to:
   receive organizational data associated with a plurality of organizational resources for an organization;
   analyze the organizational data;
   determine an integrity indicator based on the analysis of the organizational data; and
   generate a continuity indicator as a function of the integrity indicator, wherein the continuity indicator comprises a level of preparedness score for avoiding an interruption in the operation of the plurality of organizational digital resources, using a machine learning model.

2. The apparatus of claim 1, wherein receiving the organizational data comprises receiving a user input, the user input comprising a plurality of configuration data.

3. The apparatus of claim 2, wherein the configuration data comprises image configuration data.

4. The apparatus of claim 3, wherein analyzing the organizational data comprises analyzing the image configuration data using computer vision to assess a configuration of the configuration data.

5. The apparatus of claim 1, wherein receiving the organizational data comprises: automatedly surveying the plurality of organizational resources; and
   collecting the configuration data for the organizational resources.

6. The apparatus of claim 1, wherein determining the integrity indicator based on the analyzing the organizational data comprises determining the integrity indicator using an integrity indicator machine learning model.

7. The apparatus of claim 1, wherein generating the continuity indicator as a function of the integrity indicator comprises generating the continuity indicator using a continuity indicator machine learning model.

8. The apparatus of claim 1, wherein the analyzing the organizational data comprises:
   connecting to a consultant application; and
   receiving a risk engineer profile from a risk engineer using the consultant application.

9. The apparatus of claim 8, wherein analyzing the organizational data further comprises:
   outputting a notification to perform organizational digital security analysis to the consultant application.

10. The apparatus of claim 9, wherein the analyzing the organizational data further comprises analyzing the organizational data using the consultant application.

11. A method for analyzing organizational digital security, the method comprising:
    receiving, by at least a processor, organizational data associated with a plurality of organizational resources for an organization;
    analyzing, by the at least a processor, the organizational data;
    determining, by the at least a processor, an integrity indicator based on the analyzing of the organizational data; and
    generating, by the at least a processor, a continuity indicator as a function of the integrity indicator, wherein the continuity indicator comprises a level of preparedness score for avoiding an interruption in the operation of the plurality of organizational digital resources, using a machine learning model.

12. The method of claim 11, wherein the receiving, by the at least a processor, the organizational data comprises receiving a user input, the user input comprising a plurality of configuration data.

13. The method of claim 12, wherein the configuration data comprises image configuration data.

14. The method of claim 13, wherein the analyzing the organizational data comprises analyzing, by the at least a processor, the image configuration data using computer vision to assess a configuration of the configuration data.

15. The method of claim 11, wherein the receiving the organizational data comprises:
    automatedly surveying, by the at least a processor, the plurality of organizational resources; and
    collecting, by the at least a processor, the configuration data for the organizational resources.

16. The method of claim 11, wherein determining the integrity indicator based on the surveying of the organizational data comprises determining, by the at least a processor, the integrity indicator using an integrity indicator machine learning model.

17. The method of claim 11, wherein generating the continuity indicator as a function of the integrity indicator comprises generating, by the at least a processor, the continuity indicator using a continuity indicator machine learning model.

18. The method of claim 11, the analyzing the organizational data comprises:
    connecting, by the at least a processor, to a consultant application; and
    receiving, by the at least a processor, a risk engineer profile from a risk engineer using the consultant application.

19. The apparatus of method 18, wherein analyzing the organizational data further comprises:

outputting, by the at least a processor, a notification to perform organizational digital security analysis to the risk engineer using the consultant application.

20. The method of claim 19, wherein the analyzing the organizational data comprises analyzing, by the at least a processor, the organizational data using the consultant application.

\* \* \* \* \*